United States Patent
Jacobson et al.

(10) Patent No.: US 9,400,665 B2
(45) Date of Patent: *Jul. 26, 2016

(54) RUNNING ADD-ON COMPONENTS IN VIRTUAL ENVIRONMENTS

(71) Applicant: Microsoft Technology Licensing, LLC, Redmond, WA (US)

(72) Inventors: Neil A. Jacobson, Arlington, MA (US); John M. Sheehan, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

This patent is subject to a terminal disclaimer.

(21) Appl. No.: 14/108,130

(22) Filed: Dec. 16, 2013

(65) Prior Publication Data
US 2014/0109092 A1 Apr. 17, 2014

Related U.S. Application Data

(63) Continuation of application No. 11/769,022, filed on Jun. 27, 2007, now Pat. No. 8,612,972.

(51) Int. Cl.
*G06F 9/455* (2006.01)
*G06F 9/445* (2006.01)
*G06F 9/54* (2006.01)

(52) U.S. Cl.
CPC ............ *G06F 9/455* (2013.01); *G06F 9/44526* (2013.01); *G06F 9/45533* (2013.01); *G06F 9/547* (2013.01)

(58) Field of Classification Search
None
See application file for complete search history.

(56) References Cited

U.S. PATENT DOCUMENTS

| | | | |
|---|---|---|---|
| 5,812,129 A | 9/1998 | Kacor et al. | |
| 6,061,695 A | 5/2000 | Slivka et al. | |
| 6,496,847 B1 | 12/2002 | Bugnion et al. | |
| 6,839,721 B2 | 1/2005 | Schwols | |
| 6,944,819 B2 | 9/2005 | Banatwala et al. | |
| 7,085,853 B2 | 8/2006 | Volkov et al. | |
| 7,089,502 B2 | 8/2006 | Nakajima et al. | |
| 7,137,126 B1 | 11/2006 | Coffman et al. | |
| 7,207,041 B2 | 4/2007 | Elson et al. | |
| 7,213,236 B2 | 5/2007 | Gibbons | |
| 7,574,709 B2 | 8/2009 | Erlingsson et al. | |
| 8,612,972 B2 | 12/2013 | Jacobson et al. | |
| 2004/0117799 A1 | 6/2004 | Brockway et al. | |
| 2005/0246718 A1 | 11/2005 | Erlingsson et al. | |
| 2006/0010433 A1 | 1/2006 | Neil | |
| 2007/0050424 A1 | 3/2007 | Basin et al. | |

FOREIGN PATENT DOCUMENTS

EP 1630670 A2 3/2006
JP 2006-018814 A 1/2006

OTHER PUBLICATIONS

EP Application No. 08771210.5: Extended European Search Report, Dec. 20, 2010, 7 pages.
"Software Listing: Shell Extensions", retrieved on Mar. 27, 2007, at <<http://www.sharewareconnection.com/titles/shell-extensions.htm.>>, pp. 1-7.
"Windows Explorer", retrieved on Mar. 27, 2007, at <<http://windows-explorer.qarchive.org/>>, QArchive.org, 2006-2007, pp. 1-2.

*Primary Examiner* — Qing Wu
(74) *Attorney, Agent, or Firm* — Henry Gabryjelski; Kate Drakos; Micky Minhas

(57) ABSTRACT

Systems and methods for running add-on components in virtual environments are described. An add-on component can be executed in a virtual environment by setting up a communication link between a component proxy in the host operating system and a server process running in the virtual environment. The server process executes the add-on component based on commands forwarded by the component proxy forwards the commands from the operating system.

20 Claims, 4 Drawing Sheets

RUNNING ADD-ON COMPONENTS IN VIRTUAL ENVIRONMENTS

CROSS REFERENCE TO RELATED APPLICATIONS

This application is a continuation of U.S. patent application Ser. No. 11/769,022, filed Jun. 27, 2007, now U.S. Pat. No. 8,612,972, the contents of which are incorporated herein by reference in its entirety.

BACKGROUND

In application virtualization, a host operating system creates a simulated computer environment or virtual environment on a computing device to execute virtual applications without installing the virtual applications locally and without altering the host operating system. The virtual applications execute locally using the local hardware resources, and may interact with the host operating system although aspects of the virtual environment may be hidden from the host operating system (e.g., registry keys, files, etc.).

This is possible because the virtual environment contains the components needed to execute the virtual applications on the computing device, such as registry entries, files, environment variables, user interface elements, and global objects. These components in the virtual environment are not visible to the host operating system. Add-on components associated with the virtual applications, such as shell extensions, plug-ins, etc. also are not visible to the host operating system, because the host operating system does not have access to an add-on component's registry entries or files. As a result, the host operating system remains unaware of the add-on components available in the virtual environment and cannot use the functionalities provided by the add-on components available in the virtual environment.

SUMMARY

This summary is provided to introduce concepts relating to running add-on components of an application in virtual environments. These concepts are further described below in the detailed description. This summary is not intended to identify essential features of the claimed subject matter, nor is it intended for use in determining the scope of the claimed subject matter.

In an embodiment, a component proxy included in an operating system communicates with a virtual environment that includes one or more virtual applications. Add-on components are associated with the one or more virtual applications, and the component server process receives commands forwarded by the component proxy and executes the add-on components.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION OF ILLUSTRATIVE EMBODIMENTS

The following disclosure describes systems and methods for running add-on components in virtual environments. An add-on component can be executed in a virtual environment by setting up a communication link between a host operating system (i.e., operating system) and a server process running in a virtual environment. The operating system includes a component proxy which communicates with the add-on component executing in the server process. The described systems and methods also allow on-demand access and use of virtualized add-on components over a network.

While aspects of described systems and methods for running add-on components in a virtual environment can be implemented in any number of different computing systems, environments, and/or configurations, the embodiments are described in the context of the following exemplary system architecture(s).

Figure 1:
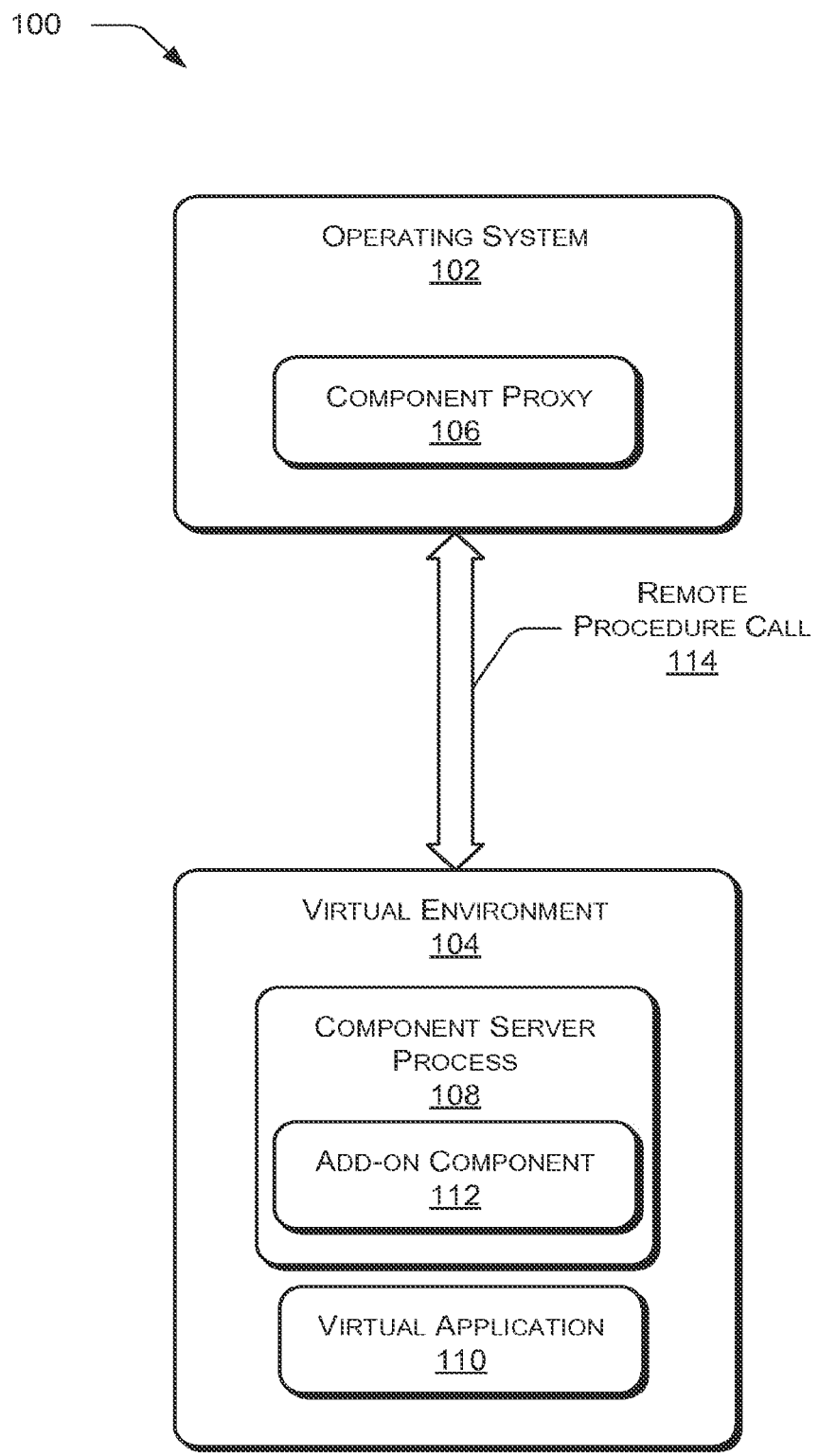
FIG. 1 illustrates an exemplary system for running add-on component in a virtual environment in one embodiment.

FIG. 1 shows an exemplary system 100 for running add-on components in a virtual environment. The system 100 may be part of, or included in, a standalone computing device such as a personal computer, or may be included as part of several computing devices. An add-on component can be a shell extension, a plug-in, or any other similar entity which can provide additional functionality to an existing application. To this end, the system 100 includes an operating system 102 on a computing device(s) and a virtual environment 104. In an implementation, system 100 can be implemented on a single computing device facilitating resource sharing between one or more virtual environments running on the computing device. The computing device can be implemented as any of known computing devices, such as a desktop computing device, a laptop, a mobile computing device, etc.

Further, the operating system 102 includes a component proxy 106 that communicates with the virtual environment 104. The virtual environment 104 includes a component server process 108 and one or more virtual applications, such as virtual application 110. The component server process 108 includes one or more add-on components associated with the virtual applications, such as add-on component 112 associated with the virtual application 110.

In order to access functionalities provided by the add-on component 112 residing in the virtual environment 104, the component proxy 106 is configured to communicate with the component server process 108 to execute the add-on component 112. For this, the component proxy 106 may communicate with the component server process 108 using application program interfaces (APIs) such as remote procedure call 114.

In an exemplary operation, a component proxy 106 is registered with the operating system 102 for each add-on component 112 available in the virtual environment 104. Registration may be performed, for example, when the virtual environment 104 is simulated on the computing device. To access the add-on component 112, the operating system 102 invokes the corresponding component proxy 106. If the operating system 102 invokes the component proxy 106 for the first time, the component proxy 106 launches the component server process 108 in the virtual environment 104 and communicates with the component server process 108 using the remote procedure call 114. The remote procedure call 114 allows a procedure or a command from the component proxy 106 to be executed in the virtual environment (e.g., virtual environment 104) without explicit code details being provided for this interaction.

An example embodiment, includes a case where there are more than one virtual environments running in the system 100, the component proxy 106 checks whether the virtual environment (e.g., virtual environment 104) in which the component server process 108 is launched is the correct virtual environment. For this, the component proxy 106 determines whether the corresponding add-on component 112 is available in the virtual environment 104. Once the correct virtual environment (e.g., virtual environment 104) is identified, the component proxy 106 launches the component server process 108 in the identified virtual environment (e.g., virtual environment 104). In another exemplary embodiment, the component proxy 106 is registered with enough information to directly connect to a server running in the appropriate virtual environment. If the server is not running in the correct virtual environment, the component proxy can detect this and launch the server. In yet another exemplary embodiment, the component proxy 106 is be able to access a manifest of each virtual environment to determine what components are supported without launching and communicating with a server inside the virtual environment.

The component server process 108 receives commands forwarded by the component proxy 106 and executes the add-on component 112 accordingly. The commands can include instructions for implementing common interfaces, such as updating the context menus, share menus, etc. in the virtual environment 104.

If the operating system 102 had previously invoked the component proxy 106 and launched the component server process 108, the component server process 108 directly forwards all commands to the add-on component 112 for further processing. For example, the operating system 102 can be a Windows™ operating system from the Microsoft™ Corporation, and the add-on component 112 can be a Windows™ operating system shell extension available in the virtual environment 104. The Windows™ operating system interacts with the virtual environment 104 through a shell extension proxy (e.g., component proxy 106) to create a corresponding instance of the shell extension (e.g., add-on component 112) in a server process (e.g., component server process 108). Once the instance of the shell extension is created, the Windows™ operating system accesses the shell extension by forwarding all commands through the shell extension proxy (e.g., component proxy 106) to the server process (e.g., component server process 108), which in turn forwards the commands to the shell extension.

It will be understood that similar methods can be used to run add-on components when there are several virtual environments running on a computing device. Additionally, each virtual environment can have several virtual applications and add-on components running on them. Moreover, there can be multiple versions of the same application and add-on components running on the computing device in the different virtual environments.

Figure 2:
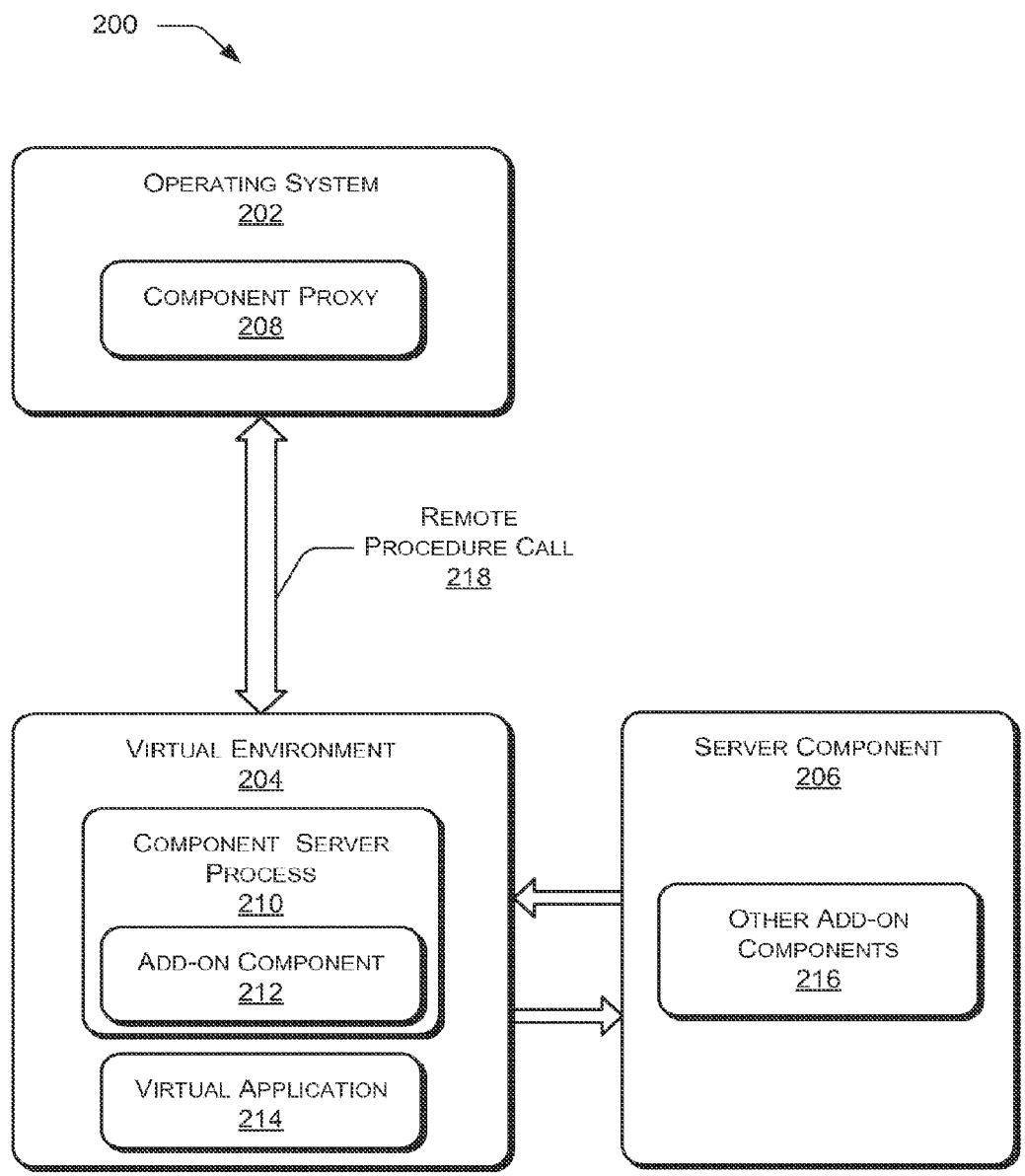
FIG. 2 illustrates an exemplary system for running an add-on component in a virtual environment in another embodiment.

FIG. 2 shows an exemplary system 200 for running add-on components in virtual environments in another embodiment. System 200 can be implemented as a standalone computing device such as a personal computer, or in server-client architecture, including a plurality of computing devices. An add-on component can be a shell extension, a plug-in or any similar entity which can provide additional functionality to an existing application. To this end, the system 200 includes an operating system 202 on a client device, a virtual environment 204 and a server component 206. In an example, the virtual environment 204 may be simulated by an application hosted on the server component 206.

The operating system 202 includes a component proxy 208 that communicates with the virtual environment 204. The virtual environment 204 includes a component server process 210, an add-on component 212, and one or more virtualized applications, such as virtual application 214.

Furthermore, other add-on components 216 can be hosted on the server component 206, or in the virtual environment 204. Also, information such as how the other add-on components 216 interact with an operating system (e.g., operating system 202) during application installation and execution can be hosted on the server component 206, or in the virtual environment 204. The server component 206 can also keep a log of registry settings; files; and other application and operating system related variables.

The operating system 202 accesses the add-on component 212 in the virtual environment 204 by communicating through a remote procedure call 218. For this, the operating system 202 can use various engines or techniques to set up a communication link between the component proxy 208 and the virtual environment 204.

As explained with reference to FIG. 1, for each add-on component 212 that can be executed in the virtual environment 204, a corresponding component proxy 208 is registered in the operating system 202. To use the functionalities provided by the add-on component 212, the operating system 202 invokes the corresponding component proxy 208. If the operating system 202 invokes the component proxy 208 for the first time, the component proxy 208 launches the component server process 210 in the virtual environment 204 and communicates with it using the remote procedure call 218. Otherwise, the component proxy 208 directly forwards all commands to the component server process 210 for further processing.

In case there are multiple virtual environments, the component proxy 208 checks whether the component server process 210 is launched in the correct virtual environment, for example virtual environment 204. For this, the component proxy 208 determines whether the virtual environment includes the corresponding add-on component 212. The component server process 210 executes the add-on component 212 in the virtual environment 204 and forwards all commands coming from the component proxy 208 to the add-on component 212.

In addition, if the add-on component 212 does not correspond to the component proxy invoked by the operating system 202, the component proxy 208 can look for a corresponding add-on component in the other add-on components 216 on server component 206 and/or in other virtual environment and systems that system 200 may be connected or networked to.

It will be understood that the above described implementations can be extended to run add-on components in virtual environments in other scenarios as well. For example, in a scenario there can be several virtual environments on a computer network, which can have several virtual applications and associated add-on components running on them. There can be multiple versions of the same virtual application and add-on component running on a network in different server devices. Furthermore, there can be instances of the same virtual application with different configurations running on the same computing device.

In another exemplary scenario, a client device can access an add-on component associated with a virtual application hosted in a server or client device on a network implementing server-client architecture. For example, the operating system 202 of a client device can invoke a component proxy corresponding to an add-on component included in the other add-on components 216 residing on the server component 206 which resides in a separate computing device. In such a case, the operating system 202 sets up a communication link with the virtual environment 204 which looks for the add-on component in the server component 206. If the add-on component is located in other add-on components 216, the client device can access the add-on component 216 via the virtual environment 204 without downloading the add-on component on the client device itself.

In another implementation, a client computing device running a plurality of virtual environments can also access add-on components from other virtual environments existing on the network that the client computing device is connected to, facilitating sharing of add-on components.

Figure 3:
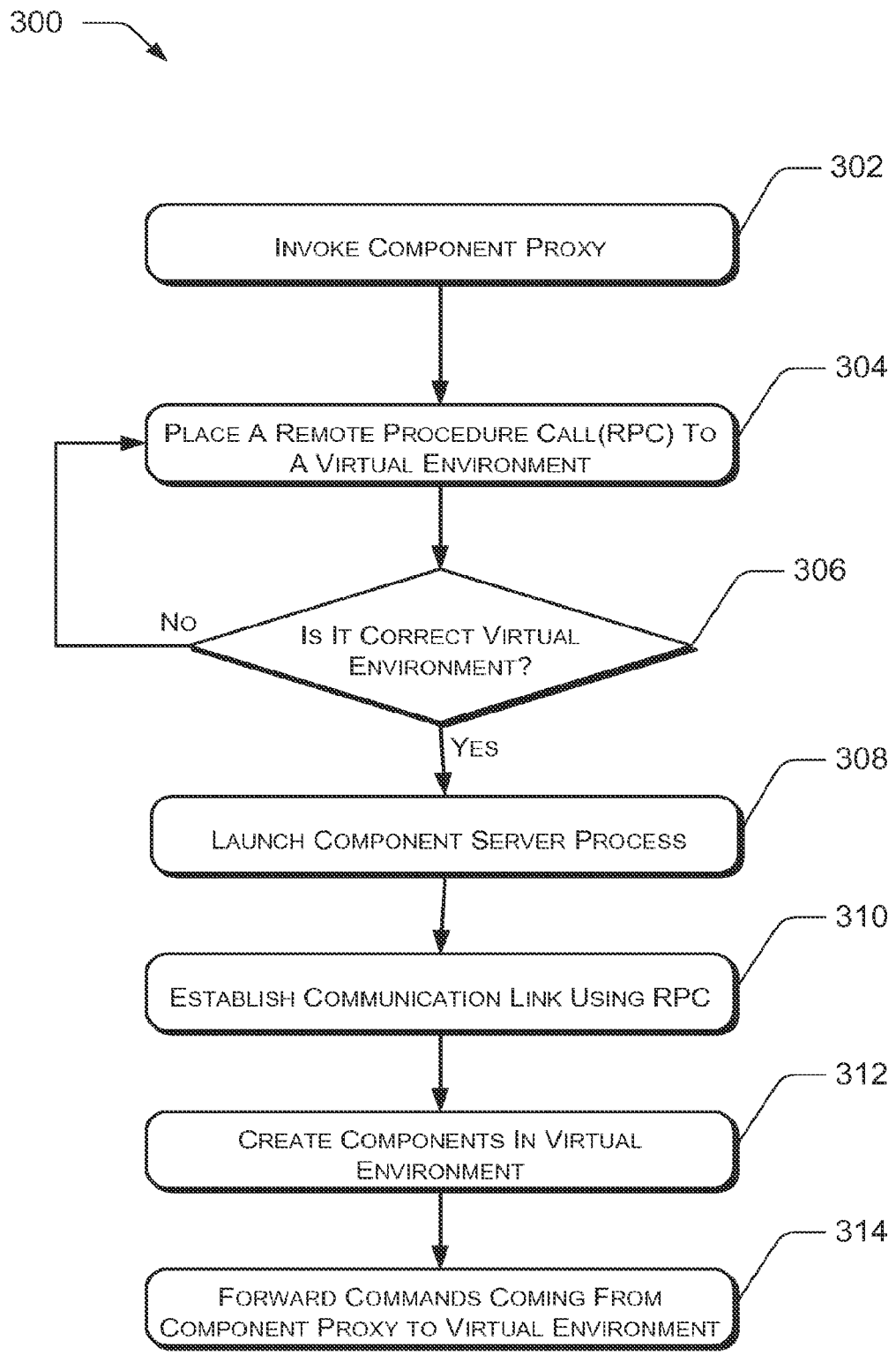
FIG. 3 illustrates an exemplary process flow diagram for running add-on components in virtual environments.

FIG. 3 is an exemplary process diagram 300 illustrating an implementation of running add-on components in virtual environments. Process diagram 300 is illustrated as a collection of steps in a logical flow graph representing a sequence of operations that can be implemented in hardware, software, firmware or a combination thereof. The order in which the method is described is not intended to be construed as a limitation, and any number of the described method blocks can be combined in any order to implement the method, or an alternate method. Additionally, individual blocks can be deleted from the method without departing from the spirit and scope of the subject matter described herein.

In the context of software, the blocks can represent computer instructions that, when executed by one or more processors, perform the recited operations. For discussion purposes, the process 300 is described with reference to the system 100 shown in FIG. 1, and the system 200 shown in FIG. 2.

At block 302, an operating system invokes a component proxy corresponding to an add-on component to use the functionalities of the add-on component. For example, the operating system 102 invokes the component proxy 106. In another example, the operating system 202 invokes the component proxy 208.

At block 304, the component proxy uses an API to associate with the virtual environment. For example, the component proxy 106 can use a RPC 114 to associate with the virtual environment 104 in system 100; or component proxy 208 can use RPC 218 to associate with virtual environment 204.

At block 306, the component proxy determines if the associated virtual environment is the correct virtual environment or not. For this, the component proxy checks whether the virtual environment includes a corresponding add-on component as requested by the operating system. If the virtual environment is determined to be the correct virtual environment (i.e., following the "YES" branch from block 306), the process flow control moves on to block 308. Otherwise, (i.e., following the "NO" branch from block 306), the process flow control moves to block 304 to set up an association with another virtual environment until the correct virtual environment is found. For example, if the add-on component 112 is not detected in virtual environment 104, the component proxy 106 looks for the add-on component 112 in other virtual environments. In another implementation, the same procedure to determine the correct virtual environment is followed on system 200.

At block 308, once the correct virtual environment is found, the component proxy launches the component server process in the correct virtual environment. For example, the component proxy 106 launches the component server process 108 in the virtual environment 104 after validating that the add-on component 112 is hosted in the virtual environment 104. In another implementation, on system 200 the component proxy 208 launches the component server process 210 in the virtual environment 204

For certain implementations, the component proxy will be registered with enough information to directly connect to a server running in the appropriate virtual environment. If the server is not running in the correct virtual environment, the component proxy can detect this and launch the server. In other implementations, the component proxy will be able to access a manifest of each virtual environment to determine what components are supported by it without launching and communicating with a server inside the virtual environment.

At block 310, a communication link is set up (i.e., established) between the component proxy in the operating system and the component server process in the virtual environment so that data and commands can be transferred between the operating system and the virtual environment. The communication link can be set up using a RPC or any other known technique. For example, the operating system 102 can set up a communication link to exchange data and commands with the virtual environment 104, subsequent to activation of the component server process 210. In another implementation, the same method to setup a communication link can be used on system 200.

At block 312, the component server process creates an instance of the add-on component corresponding to the component proxy in the virtual environment. Moreover, more than one instance of an add-on component can be created on one or more virtual environments. For example, the component server process 108 creates an instance of the add-on component 112 in the virtual environment 104 in response to the communication received from the component proxy 106. In another implementation, the same method as described for system 100 can be used to create an instance of an add-on component in system 200.

At block 314, once the add-on component is created, the component proxy forwards commands from the operating system to the component server process, which in turn forwards the commands to the add-on component. Thus the operating system can access the add-on component and can be extended by the add-on component. For example, once the operating system 102 locates the add-on component 112 in a virtual environment 104, the operating system 102 can use the functionality provided by the add-on component 112.

Exemplary Computer Environment

Figure 4:
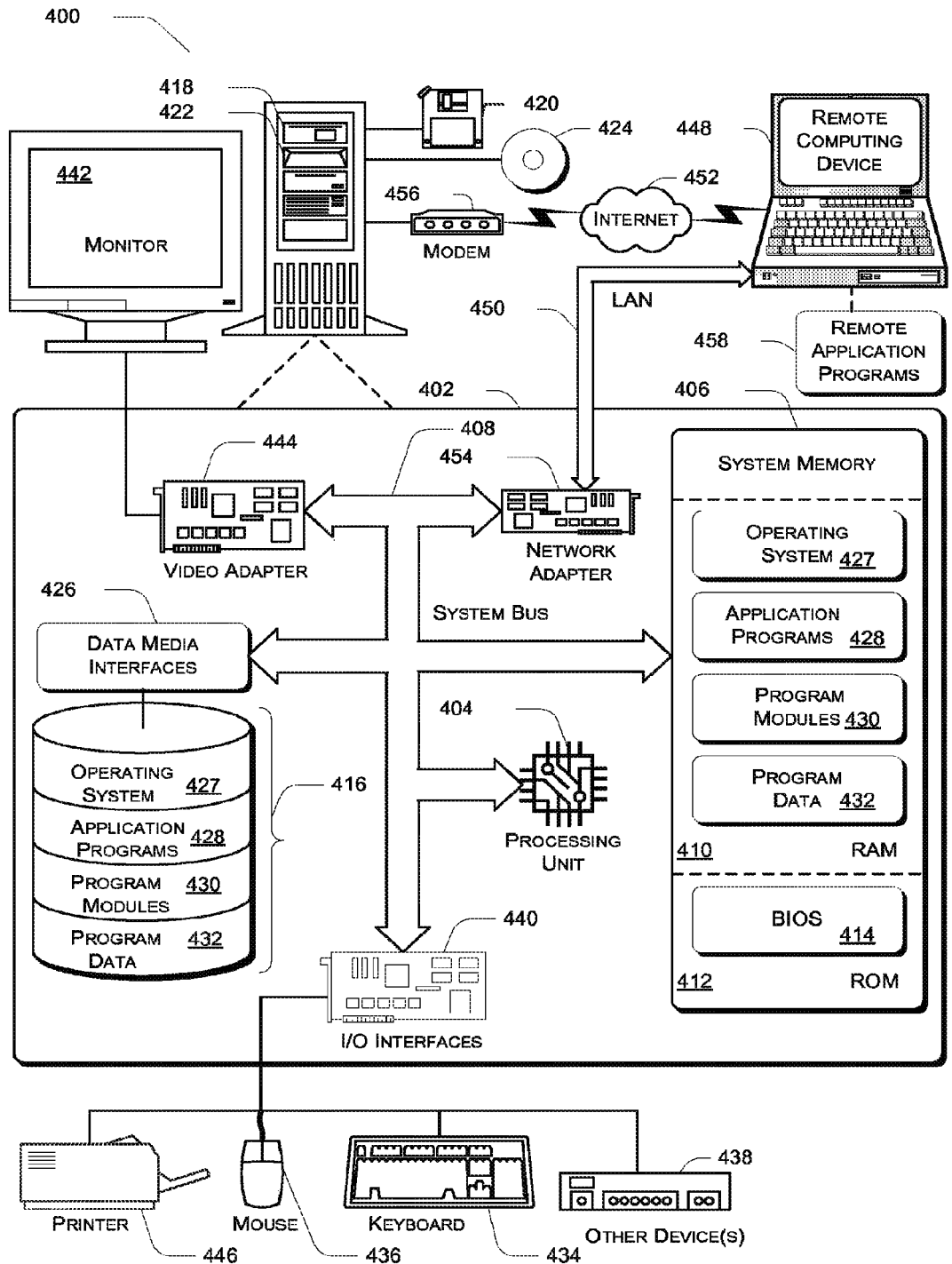
FIG. 4 illustrates an exemplary computing-based device.

FIG. 4 illustrates an exemplary general computer environment 400, which can be used to implement the techniques described herein, and which can be representative, in whole or in part, of elements described herein. For example, the general computer environment may be used for system 100 of FIG. 1 and system 200 of FIG. 2, and implement the steps described in process 300 of FIG. 3.

The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the example computer environment 400.

Computer environment 400 includes a general-purpose computing-based device in the form of a computer 402. Computer 402 can be, for example, a desktop computer, a handheld computer, a notebook or laptop computer, a server computer, a game console, and so on. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 can also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternately, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 427, one or more application programs 428, other program modules 430, and program data 432. Each of such operating system 427, one or more application programs 428, other program modules 430, and program data 432 (or some combination thereof) can implement all or part of the resident components that support the distributed file system.

A user can enter commands and information into computer 402 via input devices such as a keyboard 434 and a pointing device 436 (e.g., a "mouse"). Other input devices 438 (not shown specifically) can include a microphone, joystick, game pad, satellite dish, serial port, scanner, and/or the like. These and other input devices are connected to the processing unit 404 via input/output interfaces 440 that are coupled to the system bus 408, but can be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing-based device 448. By way of example, the remote computing-based device 448 can be a personal computer, portable computer, a server, a router, a network computer, a peer device or other common network node, and the like. The remote computing-based device 448 is illustrated as a portable computer that can include many or all of the elements and features described herein relative to computer 402.

Logical connections between computer 402 and the remote computer 448 are depicted as a local area network (LAN) 440 and a general wide area network (WAN) 442. Such networking environments are commonplace in offices, enterprise-wide computer networks, intranets, and the Internet.

When implemented in a LAN networking environment, the computer 402 is connected to a local network 440 via a network interface or adapter 444. When implemented in a WAN networking environment, the computer 402 typically includes a modem 446 or other means for establishing communications over the wide network 442. The modem 446, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, can be stored in a remote memory storage device. By way of example, remote application programs reside on a memory device of remote computer 448. For purposes of illustration, application programs and other executable program components such as the operating system are illustrated herein as discrete blocks, although it is recognized that such programs and components reside at various times in different storage components of the computing-based device 402, and are executed by the data processor(s) of the computer.

Various modules and techniques can be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules can be combined or distributed as desired in various embodiments.

An implementation of these modules and techniques can be stored on or transmitted across some form of computer readable media. Computer readable media can be any available media that can be accessed by a computer. By way of example, and not limitation, computer readable media can comprise computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework can be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for running add-on components in virtual environments have been described in language specific to structural features and/or methods, it is to be understood that the subject of the appended claims is not necessarily limited to the specific features or methods described. Rather, the specific features and methods are disclosed as exemplary implementations for running add-on components in virtual environments.

What is claimed is:

1. A system comprising:
a computing device;
a memory communicatively coupled to the computing device, the memory having stored thereon computer readable instructions that, when executed by the computing device, causes at least:
associating a component proxy with a virtual environment, the virtual environment including at least one add-on component providing one or more functionalities;
determining that the virtual environment is a correct virtual environment,
said determination being based on identifying availability of the add-on component in the virtual environment; and
responsive to the determination, launching a process in the virtual environment.

2. The system of claim 1, wherein the component proxy is configured to register with an operating system for the add-on component.

3. The system of claim 2, wherein the registration is performed when the virtual environment is simulated.

4. The system of claim 1, wherein an operating system invokes the component proxy to access the add-on component.

5. The system of claim 1, wherein the component proxy is configured to check for the correct virtual environment.

6. The system of claim 1, wherein the component proxy is configured to access a manifest of virtual environments to determine components supported by the component proxy.

7. The system of claim 1, wherein the add-on component includes a shell extension.

8. A computer-readable storage medium that excludes transitory media having computer-executable components that, when executed by a processor, perform operations comprising:
associating a component proxy with a virtual environment, the virtual environment including at least one add-on component providing one or more functionalities;
determining that the virtual environment is a correct virtual environment,
said determination being based on identifying availability of the add-on component in the virtual environment; and
responsive to the determination, launching a process in the virtual environment.

9. The computer-readable storage medium of claim 8, wherein the virtual environment is simulated by an application on a server component.

10. The computer-readable storage medium of claim 8, further comprising a server component that includes information as to interaction of the add-on component with an operating system.

11. The computer-readable storage medium of claim 10, wherein the server component is configured to log one or more of the following: registry settings, files, application variables, and operating system variables.

12. The computer-readable storage medium of claim 8, further comprising a virtual application of an application resident on a server component.

13. A method of running add-on components in a virtual environment comprising:
associating a component proxy with a virtual environment, the virtual environment including at least one add-on component providing one or more functionalities;
determining that the virtual environment is a correct virtual environment; and
responsive to the determination, launching a process in the virtual environment.

14. The method of claim 13, wherein an application program interface is used in the associating.

15. The method of claim 13, wherein the determining includes checking whether the virtual environment includes a corresponding one of the at least one add-on component.

16. The method of claim 15 further comprising forwarding commands from the component proxy to the process and to the at least one add-on component.

17. The method of claim 13, wherein the launching is performed after validating that the at least one add-on component is hosted in the virtual environment.

18. The method of claim 13 further comprising finding a correct virtual environment if the determining finds that the virtual environment is not correct, and connecting to the process running in an appropriate virtual environment.

19. The method of claim 13, wherein the component proxy is configured to access a manifest of virtual environments to determine components supported by the component proxy.

20. The method of claim 13 further comprising creating an instance of the at least one add-on component corresponding to the component proxy in the virtual environment.

* * * * *